(12) United States Patent
Ozu (10) Patent No.: US 7,963,702 B2
(45) Date of Patent: Jun. 21, 2011

(54) ROLLER BEARING (75) Inventor: Takuya Ozu, Kuwana (JP)

(73) Assignee: NTN Corporation, Osaka (JP)

( * ) Notice: Subject to any disclaimer, the term of this patent is extended or adjusted under 35 U.S.C. 154(b) by 548 days.

(21) Appl. No.: 12/084,992

(22) PCT Filed: Oct. 20, 2006

(86) PCT No.: PCT/JP2006/320904
§ 371 (c)(1),
(2), (4) Date: May 14, 2008

(87) PCT Pub. No.: WO2007/069392
PCT Pub. Date: Jun. 21, 2007

(65) Prior Publication Data
US 2009/0245708 A1  Oct. 1, 2009

(30) Foreign Application Priority Data

Dec. 16, 2005 (JP) ................................. 2005-363761
Mar. 23, 2006 (JP) ................................. 2006-081314

(51) Int. Cl.
*F16C 19/40* (2006.01)
*F16C 33/37* (2006.01)

(52) U.S. Cl. ......................... 384/551; 384/520; 384/548

(58) Field of Classification Search .................. 384/520, 384/548, 551, 560, 572, 576–580
See application file for complete search history.

(56) References Cited

U.S. PATENT DOCUMENTS

| | | | | | |
|---|---|---|---|---|---|
| 2,977,164 | A | * | 3/1961 | Witte | ............................ 384/576 |
| 3,937,532 | A | * | 2/1976 | Fuhrmann et al. ............. 384/44 |
| 4,175,805 | A | * | 11/1979 | Becker et al. ................. 384/520 |
| 4,277,117 | A | * | 7/1981 | George ........................ 384/520 |
| 4,824,265 | A | * | 4/1989 | Hofmann et al. ............. 384/560 |
| 5,226,739 | A | * | 7/1993 | Estkowski et al. ............ 384/448 |
| 5,352,047 | A | * | 10/1994 | Ingall et al. .................... 384/526 |
| 5,597,243 | A | | 1/1997 | Kaiser et al. |

(Continued)

FOREIGN PATENT DOCUMENTS

EP  0 164 968  12/1985

(Continued)

OTHER PUBLICATIONS

International Search Report mailed Dec. 5, 2006 for International Application No. PCT/JP2006/320904.

(Continued)

*Primary Examiner* — Marcus Charles
(74) *Attorney, Agent, or Firm* — Wenderoth, Lind & Ponack, L.L.P.

(57) ABSTRACT

A roller bearing having spacers interposed between rollers is provided. During operation of the bearing, the spacers are prevented from being pressed by adjacent rollers against an inner ring or inner ring, so that heat generation and wear of the spacers at a guiding surface are reduced. The roller bearing includes an outer ring, an inner ring, a plurality of rollers, and a plurality of spacers interposed between adjacent rollers. Surfaces of each spacer that face respective rolling contact surfaces of the rollers each have a concave shape that extends across a pitch circle of the rollers, and the spacers are guided by one of the outer and inner rings. When each of the spacers is held between the adjacent rollers, a clearance is formed between the one of the outer and inner rings and the spacer.

11 Claims, 7 Drawing Sheets

U.S. PATENT DOCUMENTS

| | | | | |
|---|---|---|---|---|
| 5,660,485 | A | * | 8/1997 | Podhajecki et al. ............ 384/572 |
| 6,102,579 | A | * | 8/2000 | Kupietz ........................ 384/572 |
| 6,179,474 | B1 | * | 1/2001 | Podhajecki ................... 384/573 |
| 6,315,459 | B1 | * | 11/2001 | Takano et al. ................ 384/572 |
| 6,415,676 | B1 | * | 7/2002 | Takagi et al. ................. 384/520 |
| 2009/0252448 | A1 | | 10/2009 | Ozu et al. |

FOREIGN PATENT DOCUMENTS

| | | | |
|---|---|---|---|
| EP | 750125 A1 | * | 12/1996 |
| EP | 1 921 333 | | 5/2008 |
| JP | 54-93646 | * | 7/1979 |
| JP | 6-58334 | | 3/1994 |
| JP | 8-502576 | | 3/1996 |
| JP | 2000-320548 | | 11/2000 |
| JP | 2003-314539 | | 11/2003 |
| JP | 2003-343565 | | 12/2003 |
| JP | 3549530 | | 4/2004 |
| JP | 2005-344854 | | 12/2005 |
| JP | 2007-162920 | | 6/2007 |
| WO | 2007/026851 | | 3/2007 |

OTHER PUBLICATIONS

Supplementary European Search Report dated Sep. 28, 2010 in corresponding European Application No. 06812072.4.

Japanese Office Action mailed Jun. 11, 2010 in corresponding Japanese Patent Application No. 2006-229762 w/translation.

International Preliminary Report on Patentability and Written Opinion of the International Searching Authority issued Jun. 18, 2008 in International (PCT) Application No. PCT/JP2006/320904.

* cited by examiner

Inner circumferential surface of flange of outer ring

Flat surface

Fig. 7

ROLLER BEARING

BACKGROUND OF THE INVENTION

I. Field of the Invention

The present invention relates to a roller bearing having spacers, in place of a cage, interposed between rollers.

II. Description of the Related Art

Japanese Patent No. 3549530 discloses a roller bearing having spacers, in place of a cage, interposed between rollers. Such a roller bearing allows a larger number of rollers to be mounted therein, and can provide increased load capacity.

Figure 4:
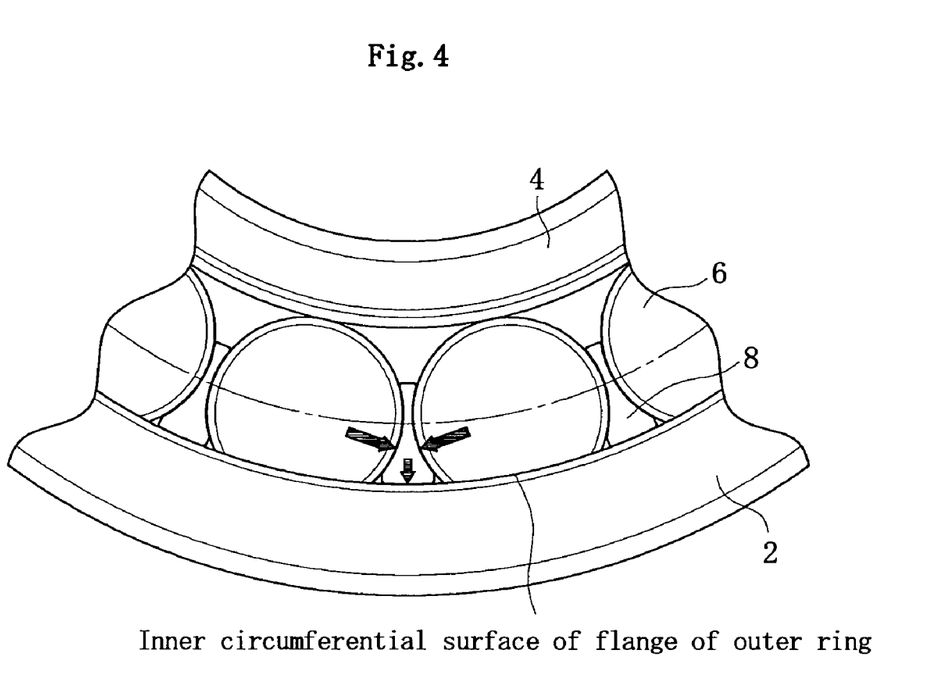
FIG. 4 is a partial enlarged side view illustrating a conventional cylindrical roller bearing.

The behavior of the spacers during operation of the bearing can be stabilized in the following manner as shown in FIG. 4. Specifically, surfaces of each spacer 8 that face the rolling contact surfaces of adjacent rollers 6 are formed into a concave shape for receiving the rolling contact surface, and the spacers 8 are guided by a bearing ring (an outer ring 2 or an inner ring 4, the outer ring 2 in this case). However, due to the concave shape of the spacers 8, the spacer 8 may receive force from each of the adjacent rollers 6, as indicated by thick arrows in FIG. 4, so as to be pressed in the radial direction of the bearing toward the inner circumference surface of a flange of the outer ring, though this depends on the shape of the spacer (the relationship of the gap between the concave shape and the bearing ring). Therefore, the bearing may rotate, with the spacers pressed against the bearing ring. In particular, when the spacers are pressed against a non-rotating ring, a breaking force acts on the spacers, and therefore seizing may occur when the rotation speed is high.

Hence, Japanese Patent No. 3549530 discloses that the surfaces of the spacers that come into contact with the roller-contacting surfaces of the rollers are formed into a flat face orthogonal to the circumferential direction of the bearing so that no radial force from the rollers is exerted on the spacers. However, the attitudes of the spacers are not always constant, so that the orthogonality of the spacer with respect to the circumferential direction of the bearing can be lost. The attitude of the spacer is corrected by the adjacent rollers. However, under the operation conditions wherein the bearing is reversed in its direction of rotation and is rapidly accelerated and decelerated, the attitudes of the spacers can be greatly disturbed. In such a case, a radial force is exerted on the spacers, and this is likely to result in heat generation at the guiding surface and abnormal wear of the spacers.

SUMMARY OF THE INVENTION

It is a principal object of the present invention to provide a roller bearing having spacers interposed between rollers, wherein the spacers are prevented from being pressed by adjacent pairs of the rollers against an outer ring or an inner ring during operation of the bearing so that heat generation at the guiding surfaces of the spacers and the wear of the spacers are reduced.

A first aspect of the present invention provides a roller bearing including an outer ring, an inner ring, a plurality of rollers, and a plurality of spacers interposed between adjacent ones of the rollers, wherein: surfaces of each spacer that face respective rolling contact surfaces of the rollers each have a concave shape that extends across a pitch circle of the rollers; the spacers are guided by one of the outer and inner rings; and, when each of the spacers is held between the adjacent rollers, a clearance is formed between the one of the outer and inner rings and the spacer. When the spacer is held between the rollers so as to be spaced apart from a raceway surface, the position of the spacer in the radial direction of the bearing is determined with the bottom of each concave shape serving as the contact position. In this instance, when the bearing is configured such that a clearance is formed between the bearing ring and the spacers as described above, the spacer is prevented from being pressed by the adjacent rollers against the bearing ring. Specifically, according to the above configuration, the spacers are basically guided by the rollers. However, only a spacer located at a circumferential clearance is released from being restrained by the adjacent rollers and is guided by the outer ring when the rotation speed is high and by the rollers or the inner ring when the rotation speed is low. Since no radial force other than the spacer's own weight and the centrifugal force is applied to the released spacer, heat generation and wear at the guiding surface of the released spacer can be reduced.

A second aspect of the present invention provides the roller bearing according to the first aspect, wherein: the one of the outer and inner rings is the outer ring; the spacers each have a surface that faces an inner surface of the outer ring; and the surface of the spacer that faces the inner surface of the outer ring is a convex shape having a radius of curvature less than the radius of curvature of the inner surface of the outer ring.

A third aspect of the present invention provides the roller bearing according to the first aspect, wherein: the one of the outer and inner rings is the inner ring; the spacers each have a surface that faces an outer surface of the inner ring; and the surface of the spacer that faces the outer surface of the inner ring is a convex shape. In the above cases, when the convex shape is formed of two flat surfaces, the radius of curvature of the convex shape is defined by the radius of curvature of an arc that connects the intersection of the flat surfaces and the edges of the flat surfaces. With the above configurations, a so-called "wedge film effect" (the effect that the viscosity of a fluid causes the fluid to be drawn into a wedge-like gap narrowed in the direction of motion, whereby pressure, or load capacity, is generated) is obtained, so that heat generation and wear at the guiding surface of the spacer can be reduced. As used herein, the "inner surface of the outer ring" may be any inner surface that can support and guide the spacers in the radial direction of the bearing and refers to, for example, the raceway surface of the outer ring or the inner surface of a flange of the outer ring. Similarly, the "outer surface of the inner ring" may be any outer surface that can support and guide the spacers in the radial direction and refers to, for example, the raceway surface of the inner ring and the outer surface of a flange of the inner ring.

A fourth aspect of the present invention provides the roller bearing according to the second aspect, wherein a relationship of $0.005 \times Dw < Sr < 0.1 \times d_1^{0.4}$ holds, where Dw is an outer diameter of the roller, $d_1$ is a diameter of the inner surface of the outer ring, and Sr is the clearance. A fifth aspect of the present invention provides the roller bearing according to the third aspect, wherein a relationship of $0.005 \times Dw < Sr < 0.1 \times d_1^{0.4}$ holds, where Dw is an outer diameter of the roller, $d_1$ is a diameter of the outer surface of the inner ring, and Sr is the clearance. With the above configurations, the clearance Sr is prevented from disappearing during operation, and the behavior of the spacers can be stabilized. Specifically, the lower limit ($0.005 \times Dw$) is a set value for allowing the spacers to be thermally expanded during operation, and the upper limit ($0.1 \times d_1^{0.4}$) is a set value for reducing the radial displacement of the spacers. Both the limits are determined by measuring the clearance in an operation test.

A spacer released from being restrained by adjacent rollers can be freely moved within the circumferential clearance, and the behavior thereof is unstable. After the released spacer passes through the circumferential clearance, this spacer is again restrained by the adjacent rollers. At this time, the spacer is abruptly moved according to the concave and convex shapes and is again guided by the rollers, and vibration is generated. Specifically, when the clearance Sr is large, the amount of displacement when the spacer is again guided by the rollers is large, and therefore it is inevitable that the vibration is large.

A sixth aspect of the present invention provides the roller bearing according to any of the first to fifth aspects, wherein a relationship of $0.001 \times Dw \times Z \leq S \leq 0.01 \times Dw \times Z$ holds, where Dw is the diameter of the roller, Z is the number of the rollers, and S is a circumferential clearance. With such a configuration, the disappearance of the circumferential clearance caused by thermal expansion of the spacers and rollers during operation of the bearing can be prevented, and therefore the behavior of the spacers can be stabilized, so that vibration can be reduced.

According to the present invention, in the roller bearing having rollers and spacers interposed between the rollers, the spacers are prevented from being pressed by the adjacent rollers against the outer or inner ring. In addition, even under the operation conditions that the bearing is reversed in its direction of rotation and is rapidly accelerated and decelerated, heat generation and wear at the guiding surfaces of the spacers are reduced. Furthermore, the behavior of the spacers is stabilized, thereby providing a roller bearing with reduced vibration.

DETAILED DESCRIPTION OF THE INVENTION

Hereinafter, the preferred embodiments of the present invention will be described with reference to the drawings.

Figure 1:
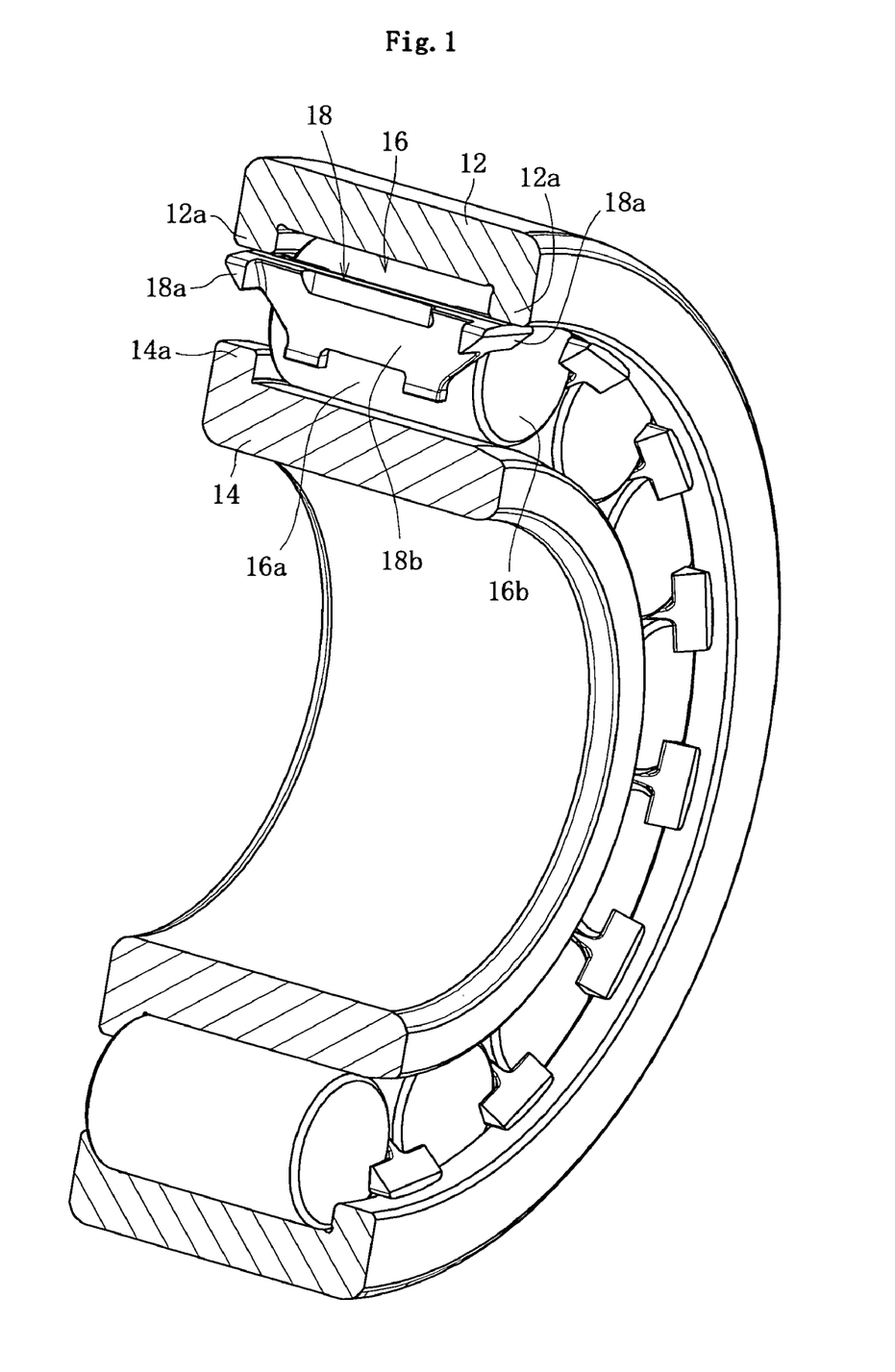
FIG. 1 is a cutaway perspective view illustrating a cylindrical roller bearing of an embodiment of the present invention.

FIG. 1 shows an explanatory embodiment in which the present invention is applied to a cylindrical roller bearing. The cylindrical roller bearing is configured to include an outer ring 12, an inner ring 14, cylindrical rollers 16, and spacers 18. This cylindrical roller bearing is of the NJ type. The outer ring 12 has flanges 12a on both sides of the raceway thereof, and the inner ring 14 has a flange 14a on one side of the raceway thereof. The cylindrical rollers 16 each have a rolling contact surface 16a that rolls on the raceway surface of the outer ring 12 and the raceway surface of the inner ring 14. Each spacer 18 is interposed between adjacent cylindrical rollers 16.

The spacers 18 have extended portions 18a formed at both axial ends thereof, and each extended portion 18a has a surface which faces one end face 16b of the cylindrical roller 16.

In this instance, the outer circumferential surface 18c of each extended portion 18a (a surface facing a radially outer side when the spacer is mounted in the bearing) is a partial cylindrical surface, or a convex curved surface. During the rotation of the bearing, the extended portions 18a of the spacer 18 are guided by the inner circumferential surfaces of the flanges 12a of the outer ring 12. In this regard, the outer circumferential surface 18c of each of the extended portions 18a is also referred to as a guiding surface. The behavior of the spacers 18 is stabilized by allowing the spacers 18 to be guided by the outer ring 12. Specifically, by allowing the outer circumferential surfaces 18c of the extended portions 18a of the spacer 18 to be supported by the inner circumferential surfaces of the flanges 12a of the outer ring 12, the radial motion of the spacer 18 is restricted, and the behavior thereof is stabilized.

Figure 2:
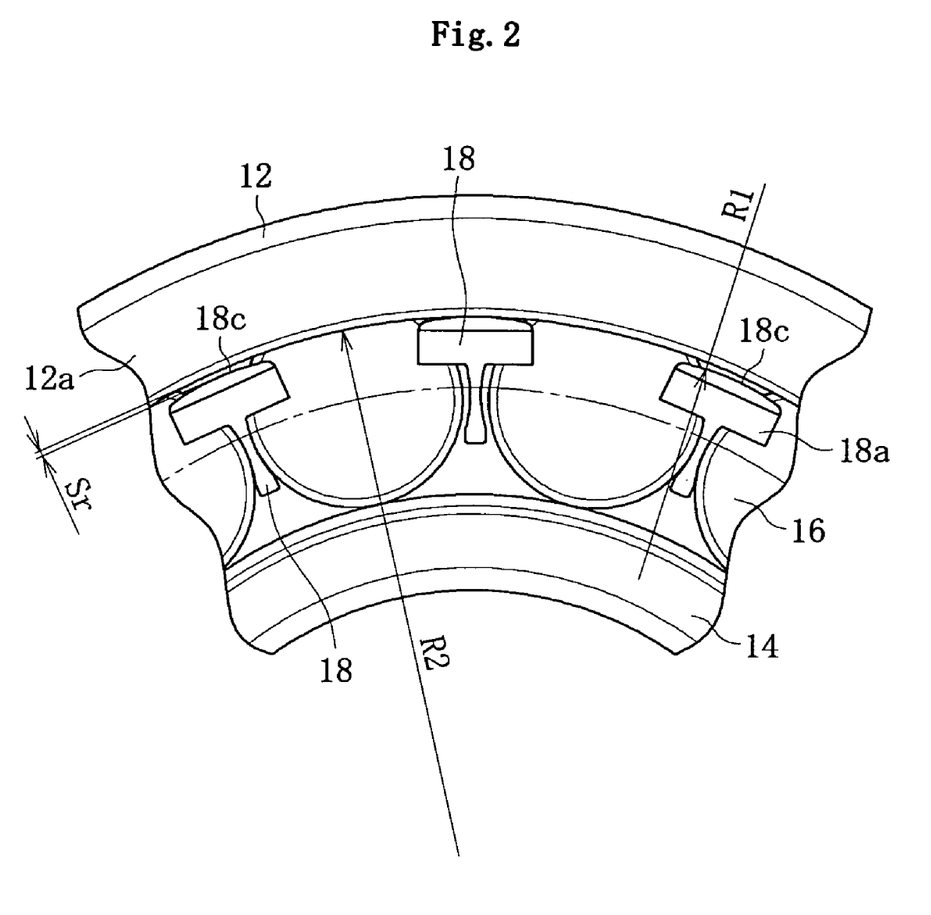
FIG. 2 is a partial enlarged side view of the bearing shown in FIG. 1.

As shown in FIG. 2, the cross-sectional shape of a surface 18b of the spacer 18 that comes into contact with the cylindrical roller 16 (hereinafter also referred to as a roller-contacting surface 18b) is a concave arc shape having a radius of curvature slightly greater than the radius of curvature of the rolling contact surface 16a of the roller 16. The roller-contacting surface 18b extends across a pitch circle of the rollers indicated by an alternate long and short dashed line, i.e., extends from the inner side of the pitch circle to the outer side. Therefore, the motion of the spacer 18 in the radial direction of the bearing is restricted by the rolling contact surfaces 16a of the rollers.

Figure 3:
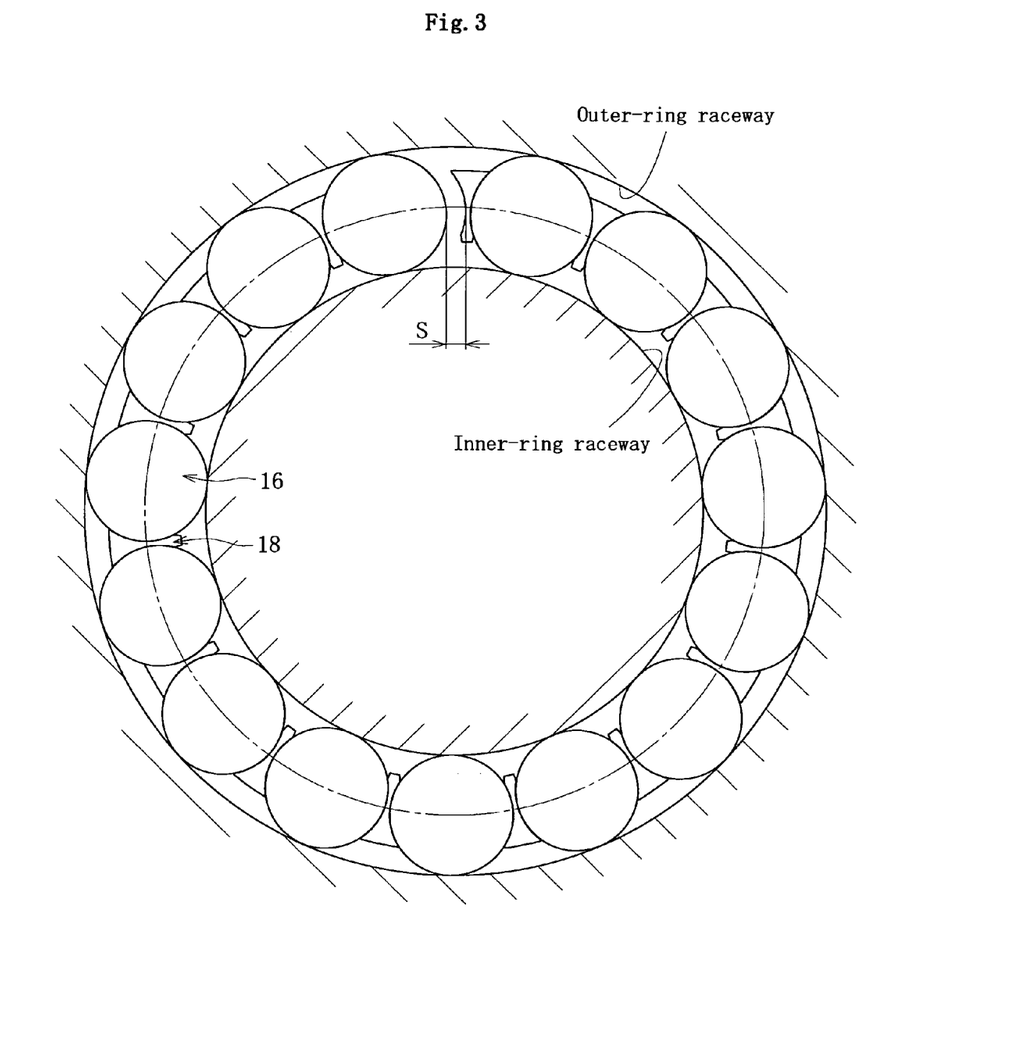
FIG. 3 is a schematic cross-sectional view of the cylindrical roller bearing.

A description will now be given of the case in which 66 Nylon (natural) is used as the material for the spacer 18 and the spacers 18 are applied to NJ2324E (φ120×φ260×86). In this case, a circumferential clearance S on the pitch circle of the rollers 16 is 1.5 mm, which is expressed by the following equation: $S = 0.0026 \times Dw \times Z$. In addition, the wall thickness of the thinnest portion of the spacer 18 is 1.8 mm. In this case, even when the temperature of the bearing is increased by 100° C., the total amount of thermal expansion of the rollers 16 and spacers 18 is approximately 1 mm. Hence, the circumferential clearance S (see FIG. 3) does not disappear, and the bearing can withstand use under normal temperature conditions. Note that the linear expansion coefficient of the cylindrical roller (bearing steel) is $12.5 \times 10^{-6}$ (° C.), and the linear expansion coefficient of the spacer (66 Nylon (N)) is $9 \times 10^{-5}$ (° C.).

The outer circumferential surface (guiding surface) 18c of each extended portion 18a faces the inner circumferential surface of the flange 12a of the outer ring 12. As shown in FIG. 2, a narrow clearance Sr is formed between the inner circumferential surface of the flange 12a of the outer ring 12 and the spacer 18 restrained between adjacent rollers 16, so that the spacer 18 is prevented from being pressed by the adjacent rollers 16 against the inner circumferential surface of the flange 12a of the outer ring 12. Specifically, as has been described, the motion of the spacer 18 in the radial direction of the bearing is restricted by the rolling contact surfaces 16a of the adjacent rollers 16. However, only a spacer 18 located at the circumferential clearance S (see FIG. 3) is released from being restrained by the adjacent rollers 16 and is guided by the inner circumferential surfaces of the flanges 12a of the outer ring 12 when the rotation speed is high.

The extended portion 18 plays a role not only in restricting the motion of the spacer 18 in the radial direction of the bearing but also in increasing the area of the guiding surface 18c.

Moreover, the surfaces of the spacer 18 that face the inner circumferential surfaces of the flanges 12a of the outer ring 12, i.e., the guiding surfaces 18c, are formed into a convex curved surface having a radius of curvature R1 smaller than the radius of curvature R2 of the inner circumferential surfaces of the flanges 12a of the outer ring 12. In this manner, the wedge film effect is produced on the guiding surfaces 18c, so that heat generation and wear at the guiding surfaces 18c of the spacers 18 can be reduced.

In addition, since the guiding surfaces 18c are formed into the convex curved surface, edge contact on the guiding surfaces 18c can be avoided even when the behavior of the spacers 18 is disturbed.

Preferably, a chamber is provided in the edges of the extended portion 18 that face the circumferential direction of the bearing.

Figure 5A:
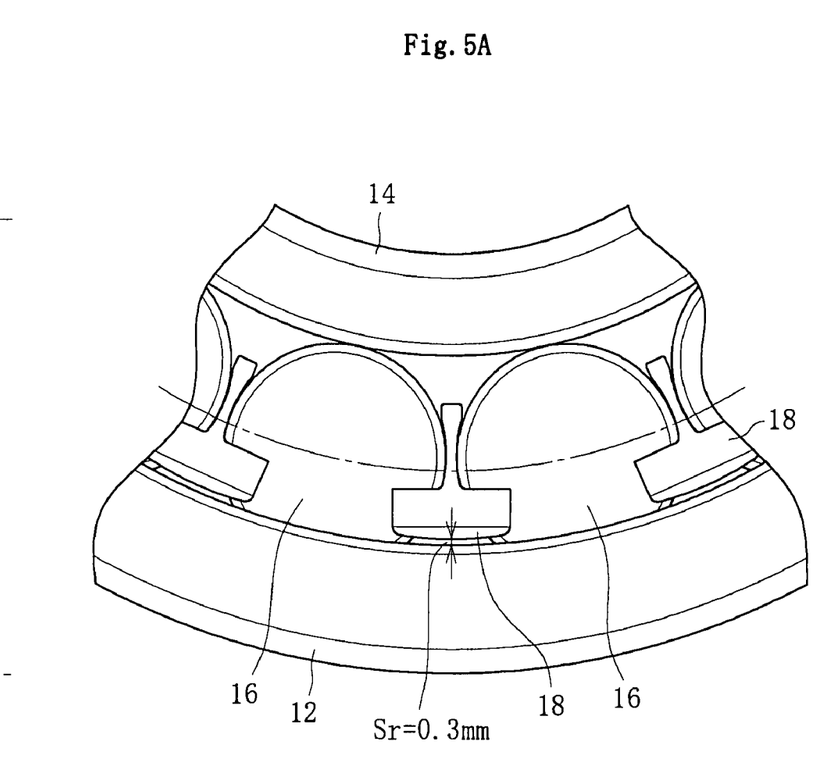
FIG. 5A is a partial enlarged side view of a test bearing (Example)
Figure 5B:
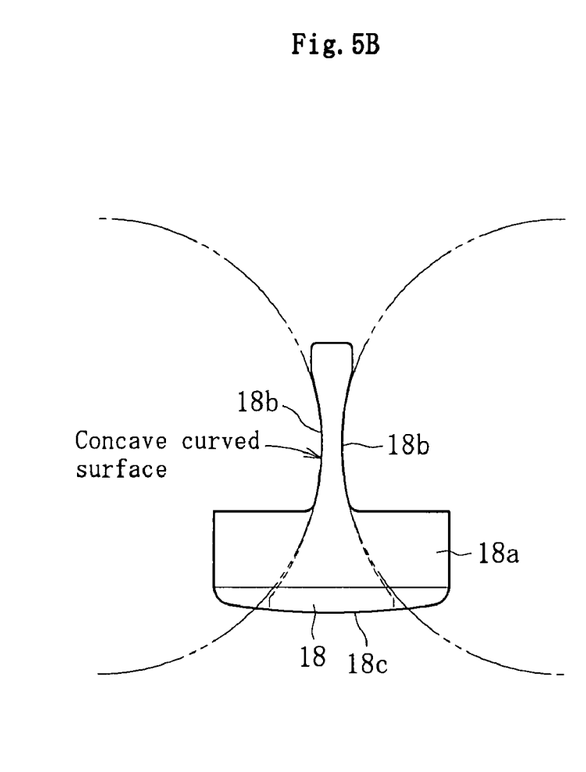
FIG. 5B is an enlarged view of a spacer.
Figure 6A:
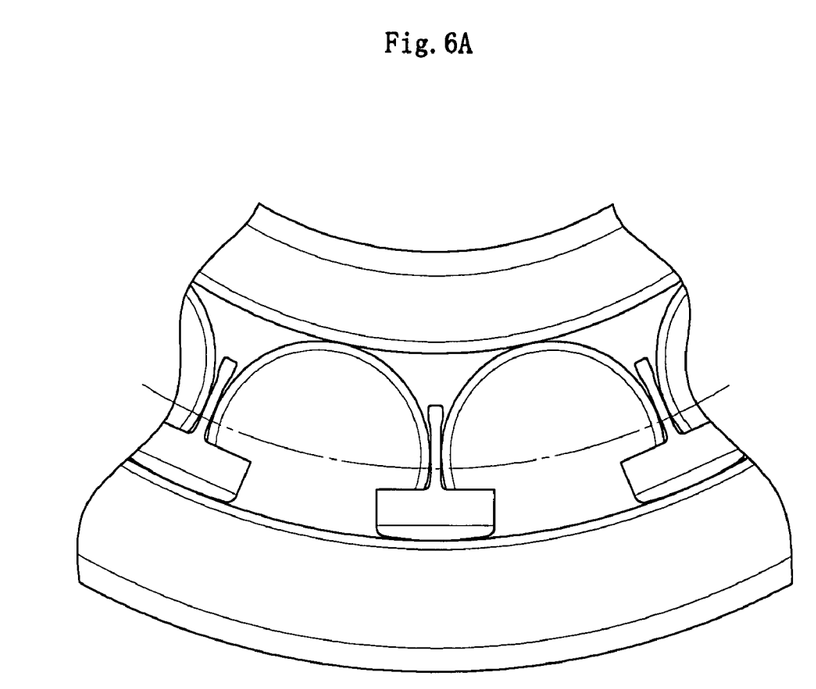
FIG. 6A is a partial enlarged side view of a test bearing (Comparative Example)
Figure 6B:
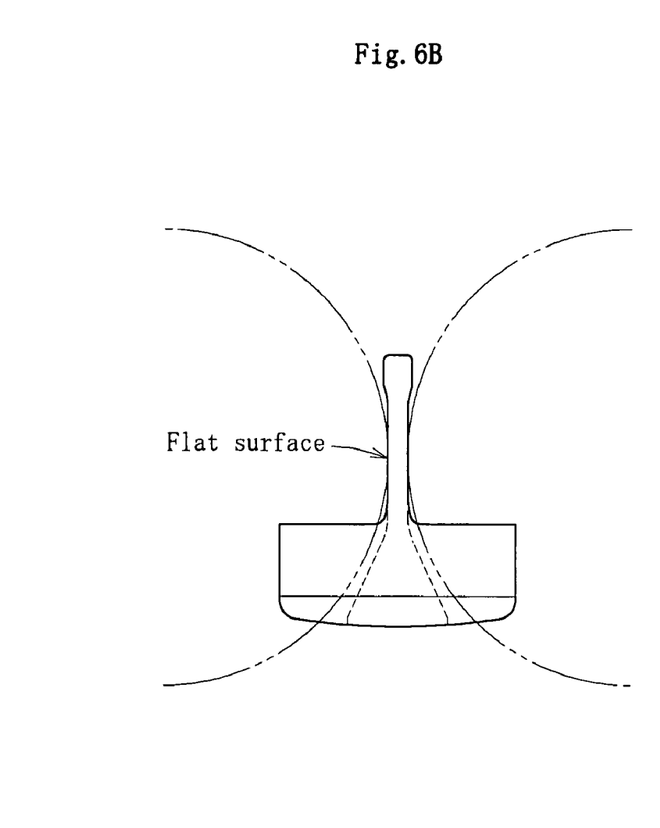
FIG. 6B is an enlarged view of a spacer.

In order to examine the effect of suppressing temperature increase according to the present invention, a temperature increase comparison test was performed for an Example and a Comparative Example (a bearing having a shape corresponding to that described in Patent Document 1). The cylindrical roller bearing shown in FIG. 1 (NJ2324E, φ120×φ260×86, specifications of the rollers: φ120×62, 15 rollers) was used as the base of the test bearings. FIGS. 5A and 5B show the structure of the bearing of the Example, and FIGS. 6A and 6B show the structure of the bearing of the Comparative Example. The bearings used are different only in the shape of the surface of the spacers that faces the rolling contact surface of the roller, and the other components are the same.

As shown in FIGS. 5A and 5B, in the Example, the surfaces of the spacer 18 that face the rolling contact surfaces of the rollers are formed into a concave curved surface that extends across the pitch circle of the rollers 16. The radius of curvature of the above-mentioned surface is 21 mm, which is slightly grater than that of the rolling contact surface of the roller (19 mm). When the spacer 18 is held between the rollers 16 so as to be spaced apart from the raceway surface of the outer ring, the position of the spacer 18 in the radial direction of the bearing is determined with the bottom of the concave shape serving as the contact position. In this case, a clearance Sr of approximately 0.3 mm is present between the spacer 18 and the inner circumferential surface of the flange of the outer ring 12. Specifically, according to the above configuration, the spacers 18 are basically guided by the rollers. Furthermore, only a spacer 18 located at the circumferential clearance is released from being restrained by the adjacent rollers 16 and is guided by the inner surfaces of the flanges of the outer ring 12 when the rotation speed is high and by the rollers 16 when the rotation speed is low.

As shown in FIGS. 6A and 6B, in the Comparative Example, the surfaces of the spacer that face the rolling contact surfaces of the rollers are formed into a flat shape orthogonal to the circumferential direction of the bearing. Specifically, so long as the above orthogonal relation is maintained, a radial force from each roller is not exerted on the spacers. Therefore, the spacer has freedom of radial motion, and all the spacers are guided by the inner surfaces of the flanges of the outer ring through the centrifugal force when the rotation speed is high.

Figure 7:
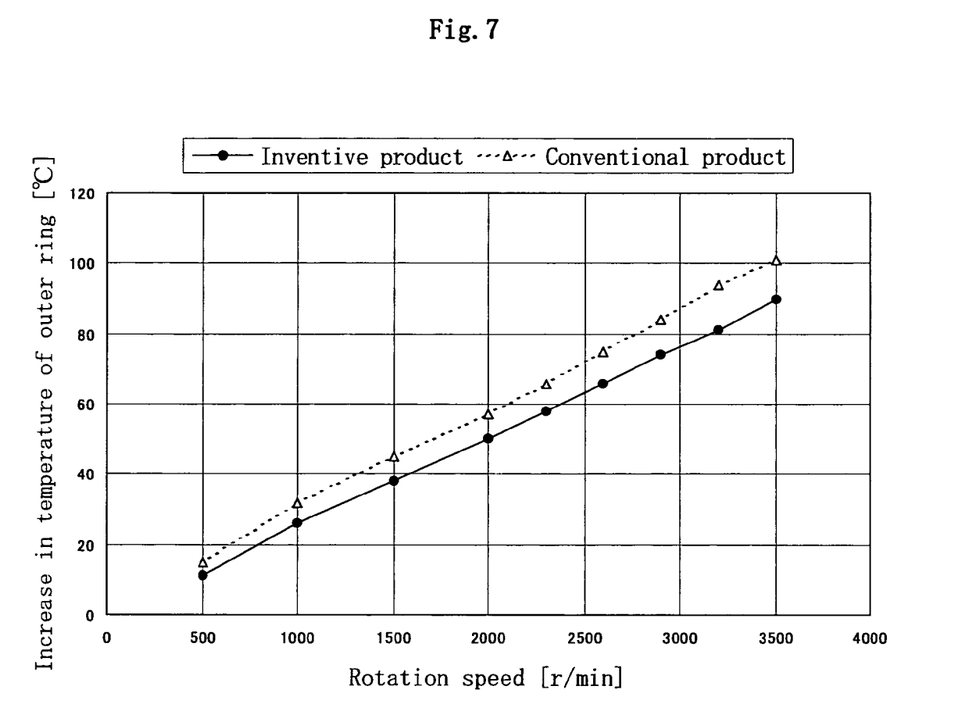
FIG. 7 is a graph showing the relationship between a rotation speed and an increase in temperature of an outer ring.

A radial load of 98 kN was applied to the test bearing of each of the Example and the Comparative Example. Then, the rotation speed of the inner ring was increased to a maximum of 3,500 r/min, and an increase in temperature of the outer ring was measured. The results are shown in FIG. 7 and Table 1. In FIG. 7, the horizontal axis represents the rotation speed (r/min) of the inner ring, and the vertical axis represents an increase in temperature (° C.) of the outer ring. The solid polygonal line represents the measured values for the Example, and the dotted polygonal line represents the measured values for the Comparative Example. The temperature increase in the Example was lower than that in the Comparative Example over the entire range, and a maximum of 13° C. of the temperature reduction effect was found as shown in Table 1.

TABLE 1

| Test bearing | Rotation speed (r/min) | | | | | | | | |
|---|---|---|---|---|---|---|---|---|---|
| | 500 | 1000 | 1500 | 2000 | 2300 | 2600 | 2900 | 3200 | 3500 |
| Example | 11 | 26 | 38 | 50 | 58 | 66 | 74 | 81 | 90 |
| Comparative Example | 15 | 32 | 45 | 57 | | 75 | 84 | 94 | 101 |

The invention claimed is:

1. A roller bearing comprising:
an outer ring;
an inner ring;
a plurality of rollers, each roller of said plurality of rollers having a rolling contact surface; and
a plurality of spacers, each spacer of said plurality of spacers being interposed between adjacent rollers, and having a plurality of surfaces,
wherein for each said spacer, each surface of said plurality of surfaces faces said rolling contact surface of one of said adjacent rollers, and each said surface of said plurality of surfaces of said spacer has concave shape that extends across a pitch circle of the rollers,
wherein said spacers are configured to be guided by one of said outer ring and said inner ring, and
wherein when each said spacer of said plurality of spacers is interposed between said adjacent rollers, a clearance is formed between said one of said outer ring and said inner ring and said spacer.

2. A roller bearing as claimed in claim 1, wherein: said one of said outer ring and said inner ring is said outer ring;
each said spacer of said plurality of spacers has a surface that faces an inner surface of said outer ring; and
said surface of each said spacer that faces said inner surface of said outer ring has a convex shape having a radius of curvature less than the radius of curvature of said inner surface of said outer ring.

3. A roller bearing as claimed in claim 2, wherein a relationship of $0.005 \times Dw < Sr < 0.1 \times d_1^{0.4}$ holds, where Dw is an outer diameter of said roller, $d_1$ is a diameter of said inner surface of said outer ring, and Sr is the clearance.

4. A roller bearing as claimed in claim 3, wherein a relationship of $0.001 \times Dw \times Z \leq S \leq 0.01 \times Dw \times Z$ holds, where Dw is the diameter of said roller, Z is the number of the rollers, and S is a circumferential clearance.

5. A roller bearing as claimed in claim 2, wherein a relationship of $0.001 \times Dw \times Z \leq S \leq 0.01 \times Dw \times Z$ holds, where Dw is the diameter of said roller, Z is the number of the rollers, and S is a circumferential clearance.

6. A roller bearing as claimed in claim 1, wherein: said one of said outer ring and said inner ring is said inner ring;

each said spacer of said plurality of the spacers has a surface that faces an outer surface of said inner ring; and
said surface of each said spacer that faces said outer surface of said inner ring is a convex shape.

7. A roller bearing as claimed in claim 6, wherein a relationship of $0.005 \times Dw < Sr < 0.1 \times d_1^{0.4}$ holds, where Dw is an outer diameter of said roller, $d_1$ is a diameter of said outer surface of said inner ring, and Sr is the clearance.

8. A roller bearing as claimed in claim 7, wherein a relationship of $0.001 \times Dw \times Z \leqq S \leqq 0.01 \times Dw \times Z$ holds, where Dw is the diameter of said roller, Z is the number of the rollers, and S is a circumferential clearance.

9. A roller bearing as claimed in claim 6, wherein a relationship of $0.001 \times Dw \times Z \leqq S \leqq 0.01 \times Dw \times Z$ holds, where Dw is the diameter of said roller, Z is the number of the rollers, and S is a circumferential clearance.

10. A roller bearing as claimed in claim 1, wherein a relationship of $0.001 \times Dw \times Z \leqq S \leqq 0.01 \times Dw \times Z$ holds, where Dw is the diameter of said roller, Z is the number of the rollers, and S is a circumferential clearance.

11. A roller bearing as claimed in claim 1, wherein each said spacer of said plurality of spacers has a first extended portion on a first side and a second extending portion on a second side, each of said first and second extending portions extending in a circumferential direction of said roller bearing.

* * * * *